(12) United States Patent
Fledersbacher et al.

(10) Patent No.: US 8,186,943 B2
(45) Date of Patent: May 29, 2012

(54) EXHAUST-GAS TURBINE IN AN EXHAUST-GAS TURBOCHARGER

(75) Inventors: Peter Fledersbacher, Stuttgart (DE); Torsten Hirth, Rutesheim (DE); Hans-Georg Lehmann, Esslingen (DE); Volker Siedle, Wernau (DE); Siegfried Sumser, Stuttgart (DE)

(73) Assignee: Daimler AG, Stuttgart (DE)

( * ) Notice: Subject to any disclaimer, the term of this patent is extended or adjusted under 35 U.S.C. 154(b) by 1196 days.

(21) Appl. No.: 12/001,078

(22) Filed: Dec. 8, 2007

(65) Prior Publication Data

US 2008/0152484 A1 Jun. 26, 2008

Related U.S. Application Data

(63) Continuation-in-part of application No. PCT/EP2006/005433, filed on Jun. 7, 2006.

(51) Int. Cl.
 *F01B 25/02* (2006.01)
(52) U.S. Cl. ........................ 415/158; 415/167
(58) Field of Classification Search .................. 415/151, 415/157, 158, 167; 60/602
 See application file for complete search history.

(56) References Cited

U.S. PATENT DOCUMENTS 5,855,117 A * 1/1999 Sumser et al. .................. 60/602
2005/0056015 A1* 3/2005 Fledersbacher et al. ......... 60/602

FOREIGN PATENT DOCUMENTS

| DE | 199 24 228 | 12/2000 |
|---|---|---|
| EP | 0 571 205 | 11/1993 |
| EP | 0 654 587 | 1/1999 |
| EP | 1 353 040 | 10/2003 |
| JP | 59 001803 | 1/1984 |
| JP | 01 058726 | 3/1989 |
| JP | 2003035151 | 2/2003 |
| WO | WO 2004/048755 | 6/2004 |
| WO | WO 2004/113686 | 12/2004 |

* cited by examiner

*Primary Examiner* — Edward Look
*Assistant Examiner* — Aaron R Eastman
(74) *Attorney, Agent, or Firm* — Klaus J. Bach

(57) ABSTRACT

In an exhaust-gas turbine of an exhaust-gas turbo-charger including a turbine wheel which is rotatably supported in a housing and to which exhaust gas can be supplied via an inlet channel and discharged out of the exhaust-gas turbine via an outlet duct, wherein a guide vane structure and an axial slide which interacts with the latter, are disposed in the turbine inlet at the transition from the inlet channel to the turbine wheel, the guide vane structure is fixedly mounted with respect to the housing and the axial slide is arranged at the turbine outlet side and is movably supported on an outlet duct contour sleeve and provided with an axial opening for accommodating the guide vane structure, and the contour sleeve includes openings which conduct exhaust gas from the inlet channel directly to the outlet duct and which are arranged so that they are covered by the axial slide when the axial slide is moved out of its open position, the guide vane structure extending axially over the contour sleeve openings so as to impart a swirl to the exhaust gas being discharged via the contour sleeve openings when the slide member is in an open position.

4 Claims, 4 Drawing Sheets

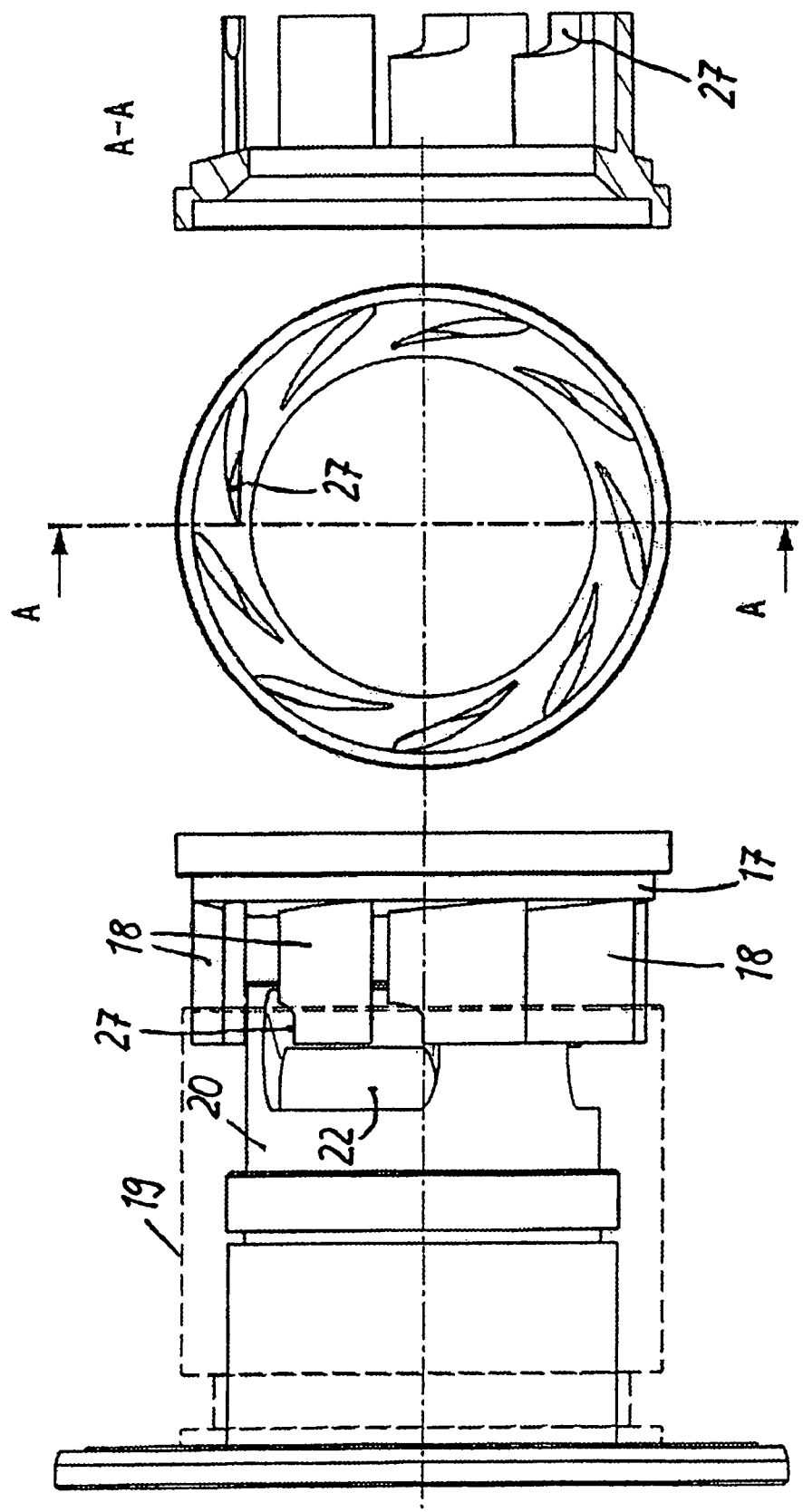

EXHAUST-GAS TURBINE IN AN EXHAUST-GAS TURBOCHARGER

This is a Continuation-in-Part Application of pending international application PCT/EP2006/005433 filed Jun. 7, 2006 and claiming the priority of German application 10 2005 027 080.8 filed Jun. 11, 2005.

BACKGROUND OF THE INVENTION

The invention relates to an exhaust-gas turbine in an exhaust-gas turbocharger having a turbine wheel which is rotatably supported in a housing including an inlet channel for supplying exhaust gas to the turbine for driving the turbine wheel.

Document EP 0 654 587 B1 discloses an exhaust-gas turbocharger for an internal combustion engine, whose exhaust-gas turbine is arranged in the exhaust strand of the internal combustion engine and whose compressor is arranged in the intake tract. The turbine wheel of the exhaust-gas turbine is driven by the pressurized exhaust gases and its rotational movement is transmitted via a shaft to the compressor wheel of the compressor. Combustion air drawn in at ambient pressure is compressed by the compressor to an increased charge pressure. The exhaust-gas turbine is provided with a variable turbine geometry, composed of an axially movable guide vane structure arranged in the turbine inlet cross section between a turbine inlet channel and the turbine wheel. By means of the guide vane structure the turbine inlet flow cross section can be adjusted between a minimal, blocking, position and a maximum, open, position. The variable turbine geometry makes it possible to variably set the exhaust-gas counterpressure as a function of the present engine operating state.

The guide vane structure in the turbine inlet cross section is supported by an axial slide and forms one of the two lateral delimiting walls of the turbine inlet cross section. In the event of a movement of the axial slide, the free end side of the guide vane structure moves into opposite recesses in the turbine housing. A larger or smaller effective turbine inlet cross section is set depending on the axial position of the axial slide.

The adjustable delimiting wall which is formed by the axial slide in the turbine inlet cross section is situated on the side of the turbine remote from the outlet duct of the exhaust-gas turbine. When the turbine inlet cross section is fully open, the delimiting wall on the axial slide is situated in alignment with the axial end of the turbine wheel blades. In contrast, when the turbine inlet cross section is reduced, the delimiting wall on the axial slide is axially moved toward the opposite side of the turbine inlet and overlays part of the turbine wheel blades, as a result of which the flow conditions between the inlet channel and the turbine wheel change significantly in a way which disturbs the exhaust gas flow through the turbine.

WO 2004/048755 A1 discloses an exhaust-gas turbocharger having an exhaust-gas turbine to which exhaust gas can be supplied via an inlet channel, with a stationary guide vane structure with guide vanes being arranged in the transition from the inlet channel to the turbine wheel. In addition, an axial slide is arranged axially movably in the turbine inlet cross section, so that the effective turbine inlet cross section can be adjusted. The axial slide at the same time forms a contour sleeve which extends radially around the turbine wheel.

Integrated into the axial slide is a bypass which, when open, permits a discharge of exhaust gas out of the inlet channel directly into the outlet channel while bypassing the turbine wheel. The bypass is embodied as a passage in a wall section of the stationary turbine housing and is delimited by the outer lateral surface of the axial slide. When the axial slide is fully retracted, the passage communicates at one end with the inlet channel and at the other end with a discharge opening which leads to the outlet duct. When the axial slide is partially or fully pushed into the turbine inlet cross section, the discharge opening to the inlet duct is in contrast closed off by the axial slide.

When the axial slide is fully open, exhaust gas which flows via the bypass and the discharge opening directly into the outlet duct, is initially conducted radially into the bypass and must subsequently be deflected by 90° in the axial direction at the outer lateral surface of the axial slide, and thereafter perform a further 90° turn back in the radial direction in order to be able to exit through the discharge opening. With said multiple deflection of the exhaust gas, it is not possible to impart a swirl to the exhaust gas which would improve the gas flow through the turbine and therefore also the turbine efficiency.

WO 2004/113686 A1 also discloses an exhaust-gas turbine in an exhaust-gas turbocharger, having a turbine wheel which is radially enclosed by a contour sleeve into which an outflow opening is formed. Seated on the contour sleeve is an axial slide which is mounted movably on the contour sleeve so that when the axial slide is in a retracted position, the discharge opening is opened and exhaust gas can flow out of the inlet channel directly into the outlet duct of the exhaust-gas turbine while bypassing the turbine wheel.

A guide vane structure in the turbine inlet cross section is however not provided in said exhaust-gas turbine. Two inlet channels which are situated adjacent to one another, but are separated from one another are arranged in the turbine housing, which inlet channels are opened or closed off in succession by the axial slide.

There is however no vane structure with the result that the exhaust gas from the inlet channels impinges on the turbine wheel without an additional swirl.

It is the object of the present invention to provide an exhaust-gas turbine in an exhaust-gas turbocharger which has a variable turbine geometry in the form of a guide vane structure associated with an axial slide and which results in favorable flow conditions in a wide operating range and to provide a possibility for realizing an efficient exhaust gas discharge function of the exhaust-gas turbine with simple design measures.

SUMMARY OF THE INVENTION

In an exhaust-gas turbine of an exhaust-gas turbo-charger including a turbine wheel which is rotatably supported in a housing and to which exhaust gas can be supplied via an inlet channel and discharged out of the exhaust-gas turbine via an outlet duct, wherein a guide vane structure and an axial slide which interacts with the latter, are disposed in the turbine inlet at the transition from the inlet channel to the turbine wheel, the guide vane structure is fixedly mounted with respect to the housing and the axial slide is arranged at the turbine outlet side and is movably supported on an outlet duct contour sleeve and provided with an axial opening for accommodating the guide vane structure, and the contour sleeve includes openings which conduct exhaust gas from the inlet channel directly to the outlet duct and which are arranged so that they are covered by the axial slide when the axial slide is moved out of its open position, the guide vane structure extending axially over the contour sleeve openings so as to impart a swirl to the exhaust gas being discharged via the contour sleeve openings when the slide member is in an open position.

As the contour sleeve openings forming a bypass passage extending around the turbine rotor are arranged at a point axially within the turbine guide vane structure, exhaust gas bypassing the turbine rotor is subjected to spin as it enters the turbine outlet duct, which improves the overall efficiency of the turbine. In addition, when the axial slide is closed in the direction of the blocking position, an effective turbine inlet cross section remains as the slide comes to rest over that part of the turbine wheel inlet which faces toward the bearing side of the turbine. In this way, the delimiting face which faces toward the bearing side of the flow duct is axially movable and the delimiting face which faces toward the outlet duct is stationary.

With the design according to the invention, it is very easily possible to provide a discharge function which is obtained for example in that, when the axial slide is in a retracted position—that is to say when the turbine inlet cross section is enlarged—a discharge path from the inlet channel to the outlet duct in the exhaust-gas turbine is opened, via which the exhaust gas can flow to the outlet duct and substantially bypass the turbine wheel blades. A so-called internal discharge is realized in this way, which can be activated for example at high engine rotational speeds in order to dissipate the exhaust-gas counterpressure. The discharge quantity can be controlled in a stepless fashion by changing the axial position of the axial slide.

The axial slide is expediently embodied as a matrix structure which is movable and has at its front end an axial opening for receiving the guide vane structure. The depth of said receiving opening and the relative position of the axial slide with regard to the guide vane structure are advantageously designed in such a way that the guide vanes on the guide vane structure are still supported in the receiving openings even when the axial slide is fully retracted.

In one preferred embodiment, the axial slide is seated on, and is mounted so as to be movable on, a contour sleeve which encases the turbine wheel. Said contour sleeve can, since it is fixedly and immovably mounted in the turbine housing, be adapted in the best possible way to the contour of the turbine wheel, so that gaps between the turbine wheel blades and the inner side of the contour sleeve are minimized, and loss of gas flow can be largely avoided. In a further advantageous embodiment, the contour sleeve has at least one discharge opening, which is opened at least when the axial slide is in the maximum open position, so that exhaust gas can pass directly from the inlet channel into the outlet duct. The guide vane structure advantageously extends axially over the discharge opening in the contour sleeve, so that, even when the axial slide is retracted and the discharge opening is opened, the outflowing exhaust gas must first pass through the guide vane structure where a swirl is imparted to it by the guide vane structure, which improves the flow conditions in the turbine outlet, as a result of which an increase in efficiency is obtained even in by-pass discharge operation of the turbine.

The invention will become more readily apparent from the following description of a particular embodiment thereof on the basis of the accompanying drawings:

BRIEF DESCRIPTION OF THE DRAWINGS

FIG. 4 shows a contour sleeve arranged in the exhaust-gas turbine, and having discharge openings, and the stationary guide vane structure with the guide vanes, FIG. 4a is an axial end view of the end side of the guide vane structure, and FIG. 4b is a side view of the guide vane structure in a sectional view taken along as per line A-A of FIG. 4a.

In the figures, identical components are provided with the same reference symbols.

DETAILED DESCRIPTION OF A PARTICULAR EMBODIMENT

Figure 1:
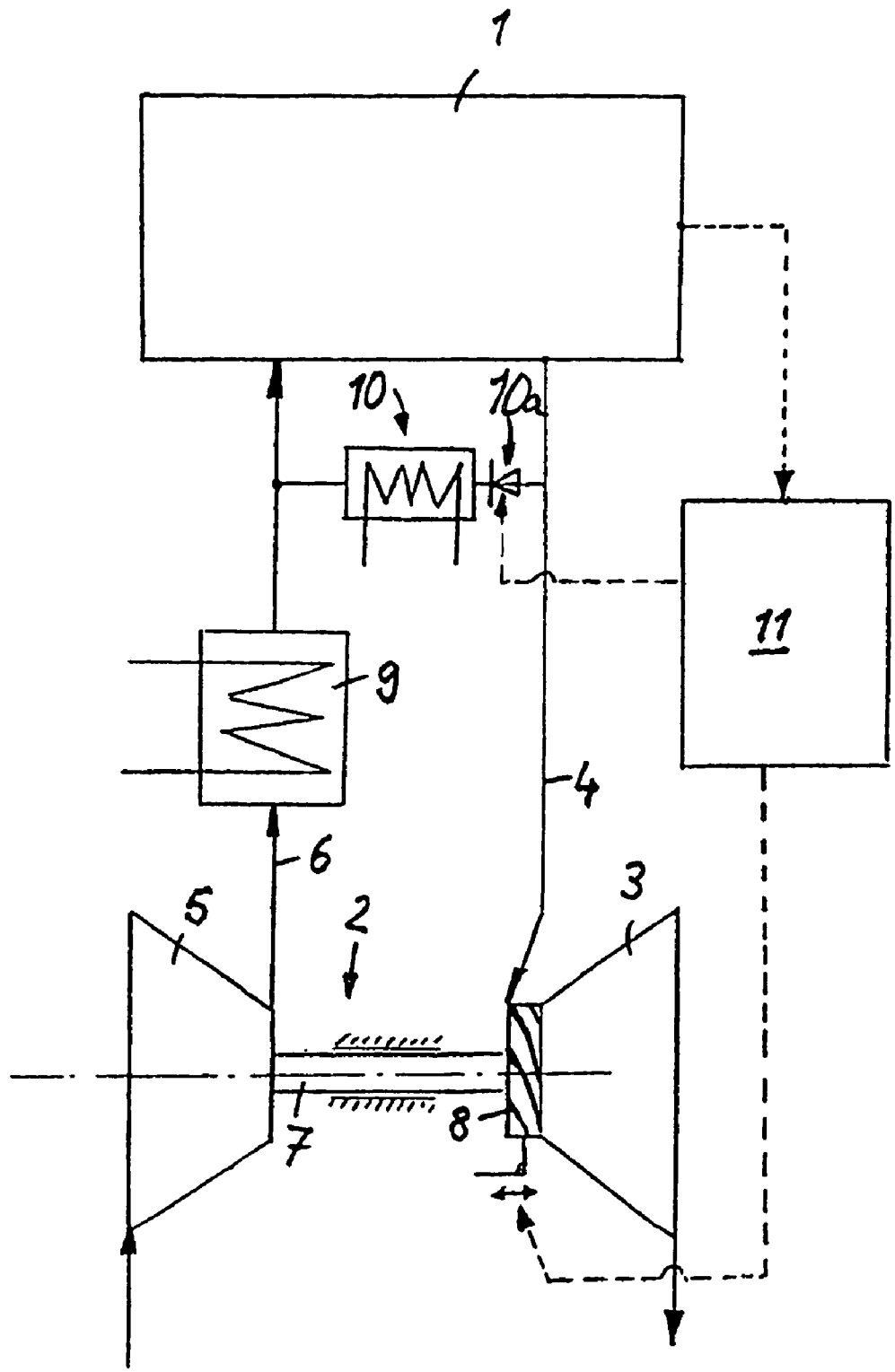
FIG. 1 is a schematic illustration of an internal combustion engine with an exhaust-gas turbocharger whose exhaust-gas turbine is provided with variable turbine geometry.

The internal combustion engine 1 which is illustrated in FIG. 1 and which is in particular a spark-ignition engine, though it may also be a diesel internal combustion engine, is provided with an exhaust-gas turbocharger 2 which comprises an exhaust-gas turbine 3 in the exhaust strand 4 of the internal combustion engine and a compressor 5 in the intake tract 6. Rotatably mounted in the exhaust-gas turbine 3 is a turbine wheel which is driven by the pressurized exhaust gases of the internal combustion engine. Said rotational movement is transmitted via a shaft 7 to the compressor wheel in the compressor 5, whereupon combustion air at ambient pressure is sucked in and compressed to an increased charge air pressure.

The exhaust-gas turbine 3 is provided with a variable turbine geometry 8 which is embodied in particular as a guide vane structure, which is disposed in the effective turbine inlet flow cross section. An interacting axial slide is movably disposed in the turbine, with an axial adjustment member of the axial slide being capable of changing the effective turbine inlet cross section between a minimum, blocking position and a maximum, open position.

Arranged downstream of the compressor 5 in the intake tract 6 is a charge-air cooler 9 in which the combustion air supplied to the engine is cooled. The cooled charge air is subsequently supplied to the cylinders of the internal combustion engine 1.

The internal combustion engine 1 is additionally provided with an exhaust-gas recirculation line 10 which comprises a recirculation line between the exhaust strand 4 upstream of the exhaust-gas turbine 3 and the intake tract 6 downstream of the charge-air cooler 9. Situated in the recirculation line is an exhaust-gas cooler and an adjustable regulating valve.

All the adjustable units of the internal combustion engine, in particular the variable turbine geometry 8 and the control valve 10a in the exhaust-gas recirculation line 10, are adjusted by means of a regulating and control unit 11 as a function of state and operating variables.

Figure 2:
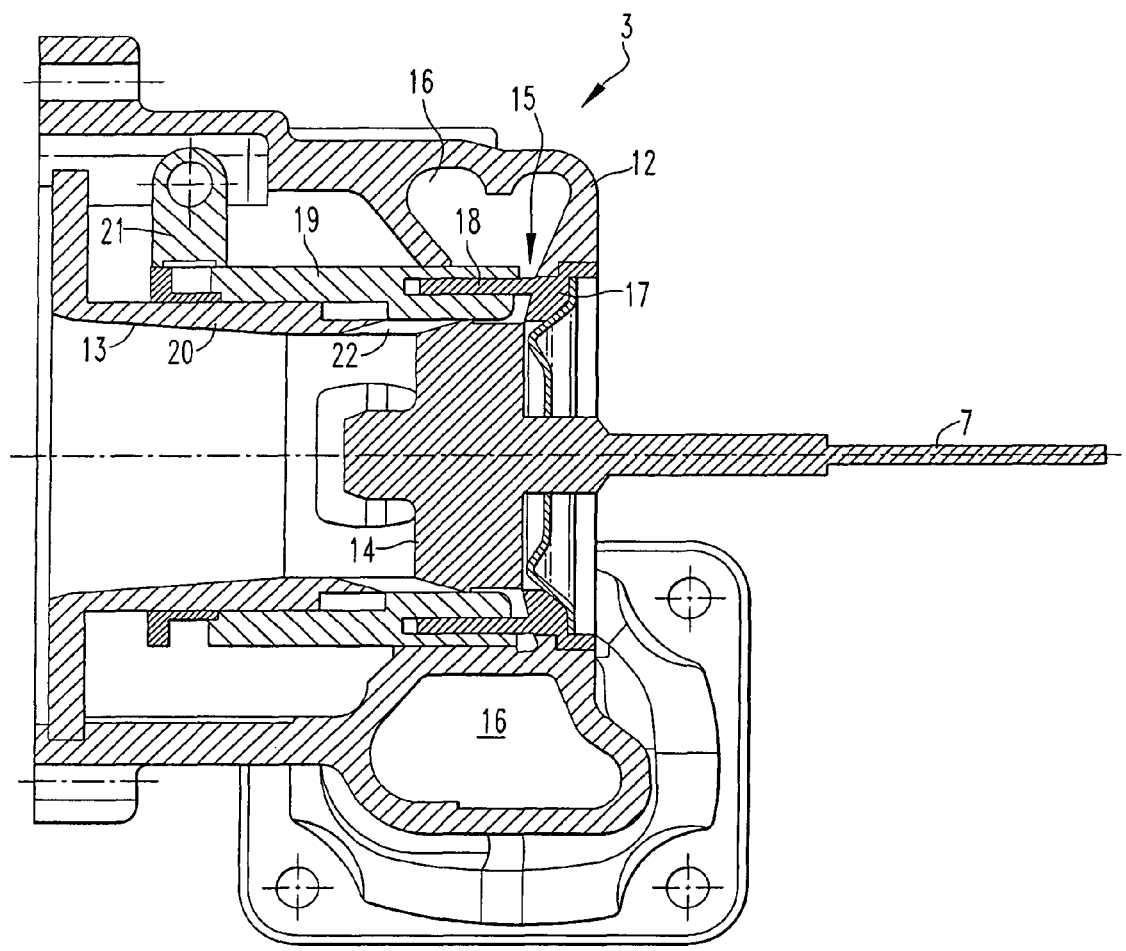
FIG. 2 shows a section through the exhaust-gas turbine of the exhaust-gas turbocharger, with a stationary guide vane structure in the turbine inlet cross section and a movable axial slide, illustrated in a closed position in which it covers the turbine guide vane structure.

FIG. 2 illustrates the exhaust-gas turbine 3 in section. The turbine wheel 14, which is rotatably mounted in a housing, is rotationally fixedly coupled by means of the shaft 7 to the compressor wheel. The exhaust gas is supplied to the exhaust-gas turbine 3 via a spiral-shaped inlet channel 16 which is formed in the turbine housing 12 and which is of single-channel design. Between the inlet channel 16, which radially surrounds the turbine wheel 14, and the turbine wheel 14 a turbine inlet cross section 15 is provided in which guide vanes 18 of a guide vane structure 17 are disposed. The guide vane structure 17 is fixed with respect to the housing. The guide vanes 18 are held in a receiving opening of an axial slide 19 which is seated on a contour sleeve 20 and is axially movable relative to the contour sleeve. The axial slide 19 is adjusted axially by means of an actuating element 21. The contour sleeve 20 extends around, or encloses, the turbine wheel blades of the turbine wheel 14 and is adapted to the contour of the turbine wheel blades. Discharge openings 22 are formed in the wall of the contour sleeve 20 so as to be distributed over the periphery. They are arranged such that, when the axial slide 19 is in an axially retracted position which corresponds to the maximum open position of the effective turbine inlet cross section 15, the discharge openings 22 are opened and provide for a discharge path extending from the inlet channel 16 via the guide blades 18 to the outlet duct 13, while bypassing the turbine wheel blades.

In the illustration of FIG. 2, the discharge openings 22 are however covered by the axial slide 19 which is situated in a blocking position wherein the effective turbine inlet flow cross-section 15 is minimized. A discharge via the discharge openings 22 is not possible in this position, but rather the exhaust gas must flow from the inlet channel 16 via the turbine inlet cross section 15 to the turbine wheel blades of the turbine wheel 14.

Figure 3:
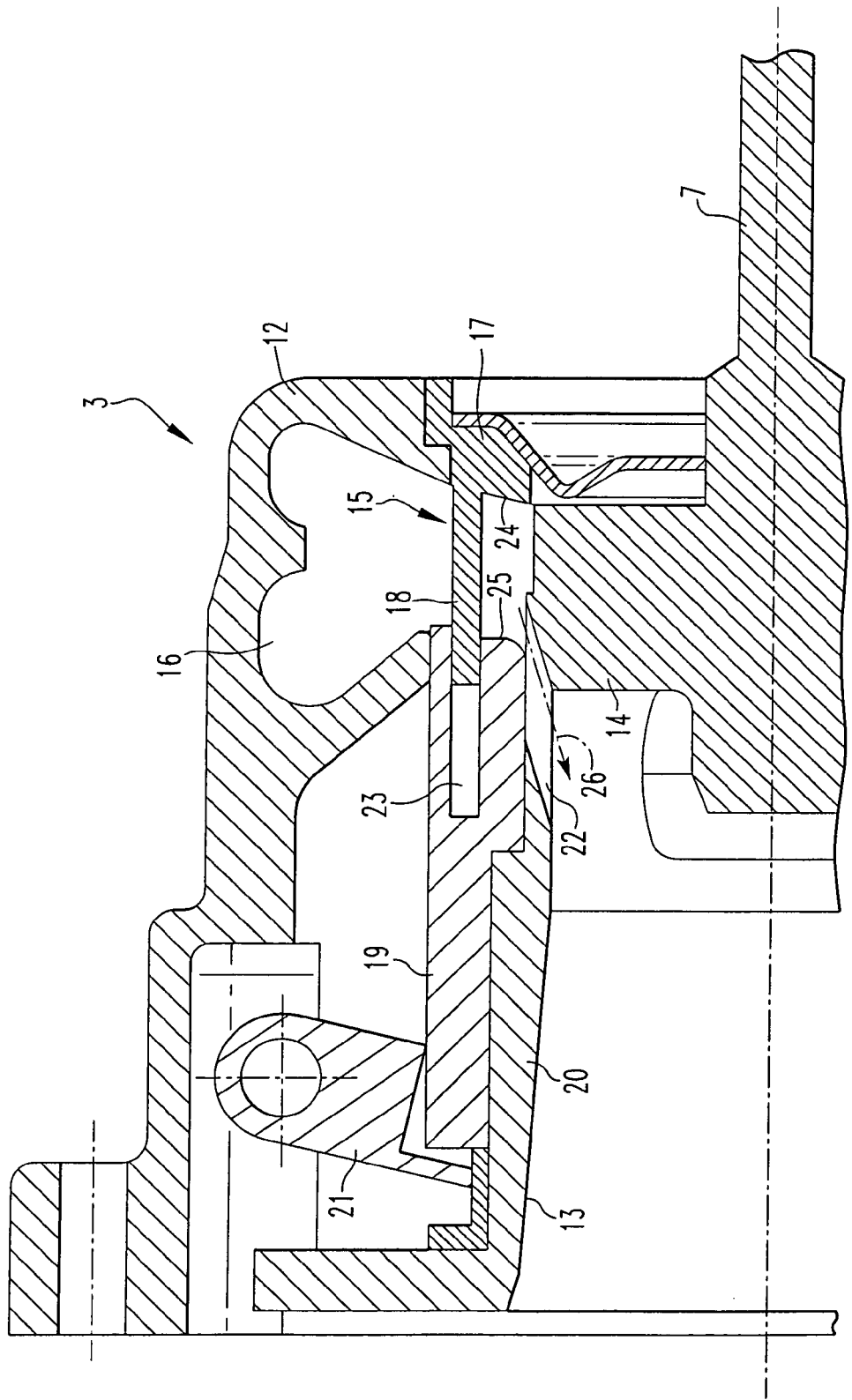
FIG. 3 shows an enlarged detail of the exhaust-gas turbine with a fully-retracted axial slide, as a result of which the turbine inlet cross section is fully open.

In the enlarged illustration of the exhaust-gas turbine 3 as per FIG. 3, the axial slide 19 is in its fully retracted position in which the effective turbine inlet cross section 15 assumes a maximum value. The turbine inlet cross section 15 is delimited by two lateral delimiting walls 24 and 25, of which the first delimiting wall 24 is a part of the guide vane structure 17 and the second, opposite delimiting wall 25 is formed by the end face of the axial slide 19. In said retracted position of the axial slide 19, although the ends of the guide blades 18 are still situated in the receiving openings 23 in the axial slide, a flow path via the discharge opening 22 is opened at the same time as indicated by the arrow 26, so that exhaust gas can flow from the inlet channel 16 via the discharge opening 22 in the contour sleeve 20 directly to the outlet duct 13 while bypassing the turbine wheel blades.

It can also be seen from FIG. 3 that the stationary guide vanes on the guide vane structure 17 extend axially into the region of the discharge opening 22, so that exhaust gas which passes through the discharge opening 22 is forced to flow through the guide vanes 18. As a result, the discharged exhaust gas also is subjected to a swirl which improves the flow conditions in particular in the outlet of the exhaust-gas turbine.

The delimiting wall 24 is fixed with respect to the housing of the turbine inlet cross section 15. It is part of the guide vane structure 17 on the side which faces away from the outlet duct 13, whereas the axial slide 19 including the end-side delimiting wall 25 is arranged on that side of the turbine inlet cross section which faces toward the outlet duct 13. The delimiting wall 24 ends axially flush with the axial end side of the turbine wheel blades. The delimiting wall 24 is slightly inclined with respect to a radial plane perpendicular to the rotational axis of the turbine rotor, and the angle of inclination lies in a range between 0° and approximately 30°.

As can be seen from FIG. 4, FIG. 4a and FIG. 4b, the outer, end-side sections 27 of the guide vanes 18 are provided with a different contour than the other sections, and are in particular radially recessed with respect to the other sections. Said outer sections 27 of the guide vanes 18 extend axially up to the level of the discharge openings 22. When the axial slide 19 is retracted, the discharge openings 22 are opened, and exhaust gas can flow out via the discharge openings. As it passes the guide vanes 18, the exhaust gas is subjected to a concomitant swirl which has advantages with respect to the flow conditions in the turbine outlet and thus leads to an improvement of the turbine efficiencies during by-pass discharge operation.

The profile of the effective turbine inlet cross section 15 over the axial travel of the axial slide 19 can, by means of the radial recessing of the guide blades in the outer sections 27, be adapted to the requirements of the engine with regard to its throughput behavior.

It is additionally advantageously possible, by using a contour sleeve 20, to design the radial outer contour of the turbine wheel blades so as to be variable with respect to the axial length. According to one advantageous embodiment, the ratio of the outlet diameter of the turbine wheel blades to the inlet diameter (TRIM) lies in a range between 0.6 and 0.85. At this ratio, the outlet diameter of the turbine wheel blades is smaller than the inlet diameter, which contributes to an improved impulse transmission to the turbine wheel.

What is claimed is:

1. An exhaust-gas turbine of an exhaust-gas turbocharger (2) having a turbine housing with a turbine wheel (14) rotatably supported in the housing and a turbine inlet channel (16) via which exhaust gas can be supplied to the exhaust-gas turbine (3) and a turbine outlet duct (13) formed by a contour sleeve (20) for discharging exhaust gas from the turbine, the turbine inlet channel (16) having an inlet cross section (15) which is formed at a transition from the inlet channel (16) to the turbine wheel (14) between two laterally opposite delimiting walls (24, 25), a guide vane structure (17) disposed in the turbine inlet channel (16) so as to extend across the inlet cross-section (15) and an axial slide (19) movably supported on the contour sleeve (20), the delimiting wall (24) of the turbine inlet cross section (15) remote from the outlet duct (13) being axially flush with the wheel blades of the turbine wheel (14) for smoothly guiding the exhaust gas to the turbine wheel (14), and a discharge opening (22) extending through the contour sleeve (20) from the turbine inlet cross section (15) to the outlet duct (13) and being arranged so as to be open when the axial slide (19) is in a retracted, maximum open position, the axial slide (19) having an opposite blocking position in which it extends over the vane structure (17) and essentially closes the effective turbine inlet cross section (15), the guide vane structure (18) extending axially across the discharge opening (22) so that, when the axial slide (19) is in the maximum open position, exhaust gas discharged via the discharge opening (22) is conducted through the guide vane structure (17).

2. The exhaust-gas turbine as claimed in claim 1, wherein that part of the guide vane structure (18) which extends over the discharge openings (22) has a contoured section (27), by means of which a chord length of the guide vane profile is shortened by up to 30%.

3. The exhaust-gas turbine as claimed in claim 1, wherein the delimiting wall (24) is part of the vane structure (17) which is fixed with respect to the turbine housing and ends axially with the turbine wheel blades of the turbine inlet cross section (5), encloses an angle of less than 30° with respect to a radial plane perpendicular to the rotational axis of the turbine rotor.

4. The exhaust-gas turbine as claimed in claim 1, wherein the ratio (TRIM) of the outlet diameter of the turbine wheel blades to the inlet diameter of the turbine wheel blades lies in the range between 0.6 and 0.85:
   $0.6 < TRIM < 0.85$.

* * * * *